United States Patent
Kanayama

(10) Patent No.: US 8,290,355 B2
(45) Date of Patent: Oct. 16, 2012

(54) LENS APPARATUS

(75) Inventor: Masaomi Kanayama, Saitama (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 12/940,629

(22) Filed: Nov. 5, 2010

(65) Prior Publication Data

US 2011/0158619 A1   Jun. 30, 2011

(30) Foreign Application Priority Data

Dec. 28, 2009  (JP) ................................. 2009-297842

(51) Int. Cl.
*G03B 17/00* (2006.01)
*H04N 5/228* (2006.01)

(52) U.S. Cl. ...................................... 396/55; 348/208.3
(58) Field of Classification Search .................... 396/55; 348/208.3
See application file for complete search history.

(56) References Cited

U.S. PATENT DOCUMENTS

| 5,155,520 A * | 10/1992 | Nagasaki et al. ............... 396/53 |
| 5,761,545 A * | 6/1998 | Tanaka et al. ................... 396/53 |
| 7,668,447 B2 * | 2/2010 | Yamazaki ........................ 396/55 |
| 2009/0059016 A1 | 3/2009 | Moriya et al. |

FOREIGN PATENT DOCUMENTS

| JP | 2001-285702 | * 12/2001 |
| JP | 2002-229089 A | 8/2002 |

* cited by examiner

*Primary Examiner* — Rodney Fuller
(74) *Attorney, Agent, or Firm* — Rossi, Kimms & McDowell LLP

(57) ABSTRACT

A lens apparatus supported by a support member, includes a correction lens for correcting an image blur, a correction lens driving portion for driving the correction lens, a vibration detection portion for detecting vibration of the lens apparatus, and a driving signal calculation unit for calculating a driving signal used for driving the correction lens. The driving signal calculation unit includes a detected vibration calculation portion for calculating a vibration signal based on an output from the vibration detection portion, a panning/tilting component calculation portion for calculating a pan/tilt operation signal based on pan/tilt operation information input from the support member, and a subtraction portion for subtracting the pan/tilt operation signal from the vibration signal. The correction lens driving portion drives the correction lens based on an output from the subtraction portion.

6 Claims, 6 Drawing Sheets

LENS APPARATUS

BACKGROUND OF THE INVENTION

1. Field of the Invention

The present invention relates to a lens apparatus having an image stabilization function.

2. Description of the Related Art

A conventional image stabilizing apparatus as disclosed in, for example, Japanese Patent Application Laid-Open No. 2002-229089, which is installed in a lens apparatus, detects vibration by using a vibration sensor to control a correction lens for decentering an optical axis according to the detected vibration. As the vibration sensor, an angular velocity sensor that mainly outputs an analog signal is used, and when vibration occurs, the angular velocity sensor detects an angular velocity and outputs an analog signal according to the vibration. The output angular velocity signal is converted into a vibration angle signal by integration, and the calculated vibration angle signal thus is used for calculating a control amount of the correction lens. This control data is used for controlling a driving device such as a motor, to thereby correct an image blur.

Further, there is proposed such an operation that whether or not the lens apparatus is in a pan/tilt operation is automatically determined based on a vibration signal obtained from the vibration sensor, and when it is determined that the lens apparatus is in the pan/tilt operation, the mode of correction for an image blur is switched to an appropriate one. In an example of the proposed operation, when it is determined that the lens apparatus is in the pan/tilt operation, the correction for an image blur is stopped to prevent the screen from becoming unnatural because of the correction for the image blur performed during the pan/tilt operation, and to improve operability of the pan/tilt operation. Whether or not the lens apparatus is in the pan/tilt operation is determined by, for example, detecting whether or not the intensity of the vibration signal obtained from the vibration sensor continues to exceed a predetermined threshold value for a fixed period of time or longer.

However, even during the intended pan/tilt operation, if the displayed image transitions slowly, an image blur due to vibration is noticeable in the displayed image. Therefore, it is desired that the image blur due to vibration is corrected even during the intended pan/tilt operation.

In view of the above, it is conceived that filtering or other such processing is performed to separate a signal component attributed to the vibration from a signal component attributed to the intended pan/tilt operation in the signal output from the vibration detection portion, to thereby correct an image blur based only on the signal component attributed to the vibration targeted for the correction. However, the frequency component of the signal component attributed to the vibration is generally distributed approximately from 0.5 Hz to 30 Hz, and the signal component attributed to the intended pan/tilt operation is also included in this frequency band. Accordingly, it is difficult to completely separate the signal component attributed to the vibration targeted for correction from the signal component attributed to the intended pan/tilt operation.

SUMMARY OF THE INVENTION

It is therefore an exemplary object of the present invention to provide a lens apparatus in which a signal corresponding to motion of the lens apparatus attributed to a pan/tilt operation is generated based on operation information of a support member, and a correction lens is driven based on a difference between the generated signal and a signal from a vibration detection portion.

In order to achieve the above-mentioned object, the present invention provides a lens apparatus supported by a support member, which includes: a correction lens for correcting an image blur; a correction lens driving portion for driving the correction lens; a vibration detection portion for detecting vibration of the lens apparatus; and a driving signal calculation unit for calculating a driving signal used for driving the correction lens, in which the driving signal calculation unit includes: a detected vibration calculation portion for calculating a vibration signal based on an output from the vibration detection portion; a panning/tilting component calculation portion for calculating a pan/tilt operation signal based on pan/tilt operation information input from the support member; and a subtraction portion for subtracting the pan/tilt operation signal from the vibration signal, and in which the correction lens driving portion drives the correction lens based on an output from the subtraction portion.

Further features of the present invention will become apparent from the following description of exemplary embodiments with reference to the attached drawings.

According to the present invention, based on the operation information output from the support member, the signal component attributed to the intended pan/tilt operation can be eliminated from the signal of the vibration detection portion, and accordingly an image blur can be corrected with respect only to a vibration component attributed to vibration from the ground or the like even during the intended pan/tilt operation.

DESCRIPTION OF THE EMBODIMENTS

Hereinbelow, exemplary embodiments of the present invention are described in detail with reference to the attached drawings.

First Embodiment

Figure 1:
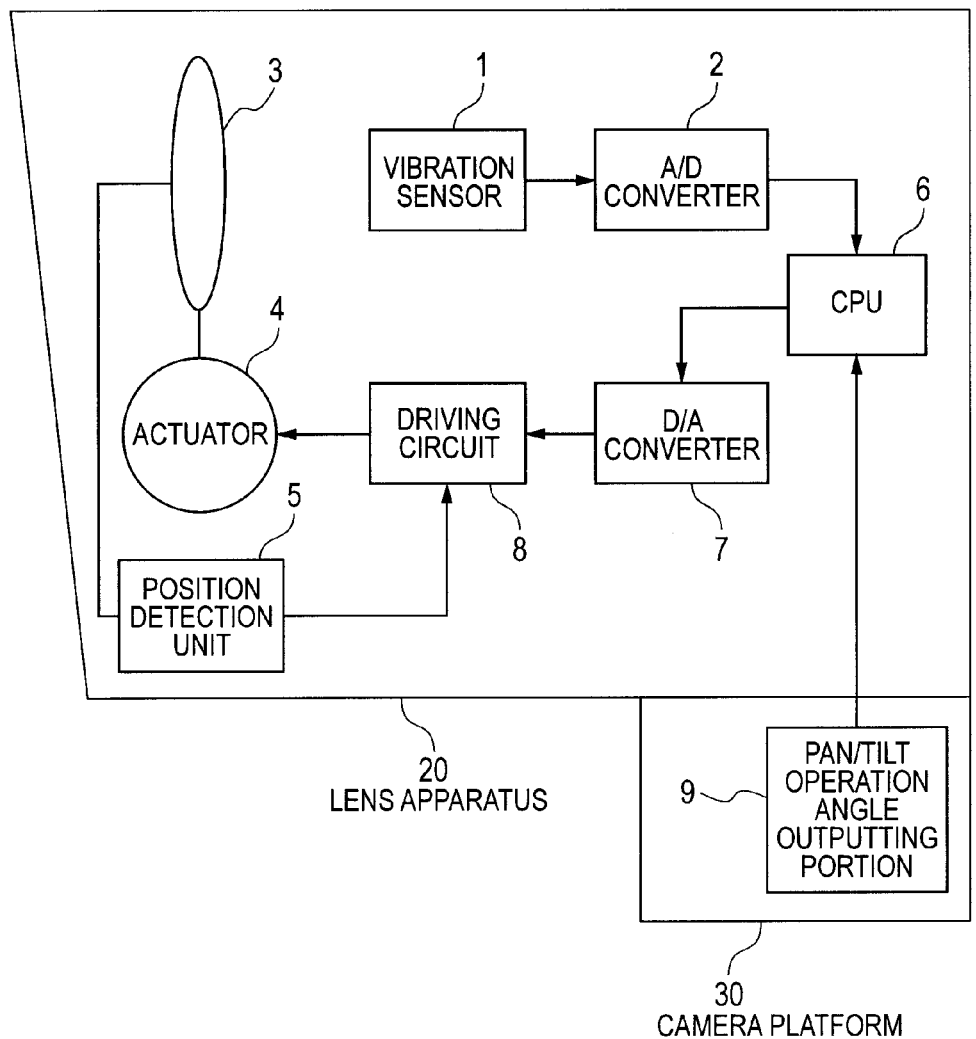
FIG. 1 is a schematic configuration diagram of a lens apparatus having an image stabilization function according to a first embodiment of the present invention.

FIG. 1 is a configuration diagram illustrating a lens apparatus 20 having an image stabilization function according to a first embodiment. The lens apparatus 20 is attached to and supported by a camera platform (support member) 30 including an outputting portion for outputting a pan/tilt operation angle signal of the lens apparatus. The lens apparatus 20 includes a vibration sensor (vibration detection portion) 1 for detecting vibration of the lens apparatus 20, an A/D converter 2 for analog-digital converting of a signal output from the vibration sensor 1 so that the converted signal is input to a CPU 6, an image blur correction lens 3 for correcting an image blur on an imaging plane by decentering the image blur correction lens in a direction perpendicular to the optical axis, an actuator (correction lens driving portion) 4 for driving the image blur correction lens 3, a position detection unit 5 for detecting a position of the image blur correction lens 3, the CPU (driving signal calculation unit) 6 for calculating a control signal (driving signal) for the image blur correction lens 3 based on an output from the A/D converter 2, a D/A converter 7 for converting the calculation result obtained by the CPU 6 into an analog signal, a driving circuit (driving portion) 8 for driving the actuator 4, and a pan/tilt operation angle outputting portion 9 for detecting a pan/tilt operation angle of the camera platform 30, and outputting a digital signal proportional to a pan/tilt operation amount. In FIG. 1, functional blocks for two axes of panning and tilting are required supposedly, but the following description is directed only to one of the axes because the basic configurations for panning and tilting are the same. In this embodiment, the pan/tilt operation angle outputting portion 9 outputs reference position data at the time of power-on, and then outputs data proportional to a position relative to the reference pan/tilt position at the time of power-on. The pan/tilt operation angle outputting portion 9 may be implemented by, for example, an incremental rotary encoder and a counter.

Figure 2:
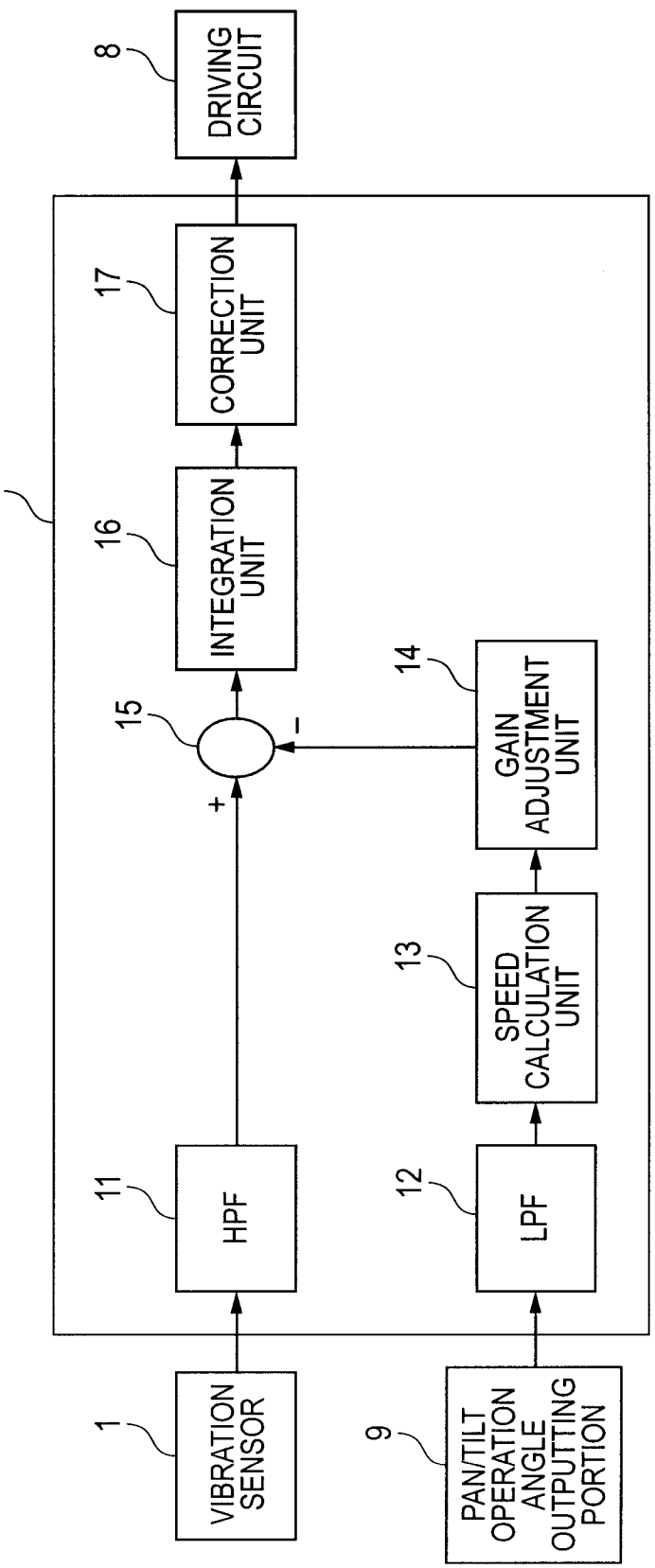
FIG. 2 is a block diagram of elimination of a panning component according to the first embodiment.

FIG. 2 is a block diagram illustrating an operation of elimination of a panning component, which is performed by the CPU 6 of the lens apparatus 20. Hereinbelow, the operation of the CPU 6 is described with reference to the block diagram of FIG. 2.

An operation of the camera platform 30 includes a pan operation in the horizontal direction and a tilt operation in the vertical direction. The image blur correction lens 3 can be driven in two directions, namely, horizontal and vertical directions. For simple description, it is hereinafter assumed that the operation of the camera platform 30 is the pan operation while the driving direction of the image blur correction lens 3 is the horizontal direction.

The CPU (driving signal calculation unit) 6 includes a detected vibration calculation portion for calculating a vibration signal based on the output from the vibration sensor 1, a panning/tilting component calculation portion for calculating a pan/tilt operation signal based on pan/tilt operation information input from the pan/tilt operation angle outputting portion 9, and a subtraction portion for subtracting the pan/tilt operation signal from the vibration signal.

In this embodiment, the detected vibration calculation portion includes a high-pass filter (HPF) 11 that passes only a high frequency component. The CPU 6 receives an angular velocity signal output from the vibration sensor 1 through the A/D converter (not shown). When the angular velocity signal is applied to the HPF 11, a DC component and a low frequency signal component are eliminated. The angular velocity signal after being applied to the HPF 11 contains only a signal component attributed to vibration from the ground or the like when the lens apparatus is not in the pan operation. When the lens apparatus is in the pan operation, on the other hand, the angular velocity signal contains a signal component attributed to the vibration and a signal component attributed to the pan operation.

In this embodiment, the panning/tilting component calculation portion includes a low-pass filter (LPF) 12 that passes only a low frequency component, a speed calculation unit 13, and a gain adjustment unit 14.

The CPU 6 receives an operation angle signal of the lens apparatus that is output from the pan/tilt operation angle outputting portion 9. When the operation angle signal is applied to the LPF 12, a high frequency vibration component is eliminated. The speed calculation unit 13 converts the operation angle signal after being applied to the LPF 12 into an angular velocity signal. The gain adjustment unit 14 adjusts the amplitude of the angular velocity signal. The signal (pan/tilt operation signal) output from the gain adjustment unit 14 has an angular velocity of zero in the stationary state of the lens apparatus, but during the pan operation, has an angular velocity attributed to the pan operation.

Figure 3:
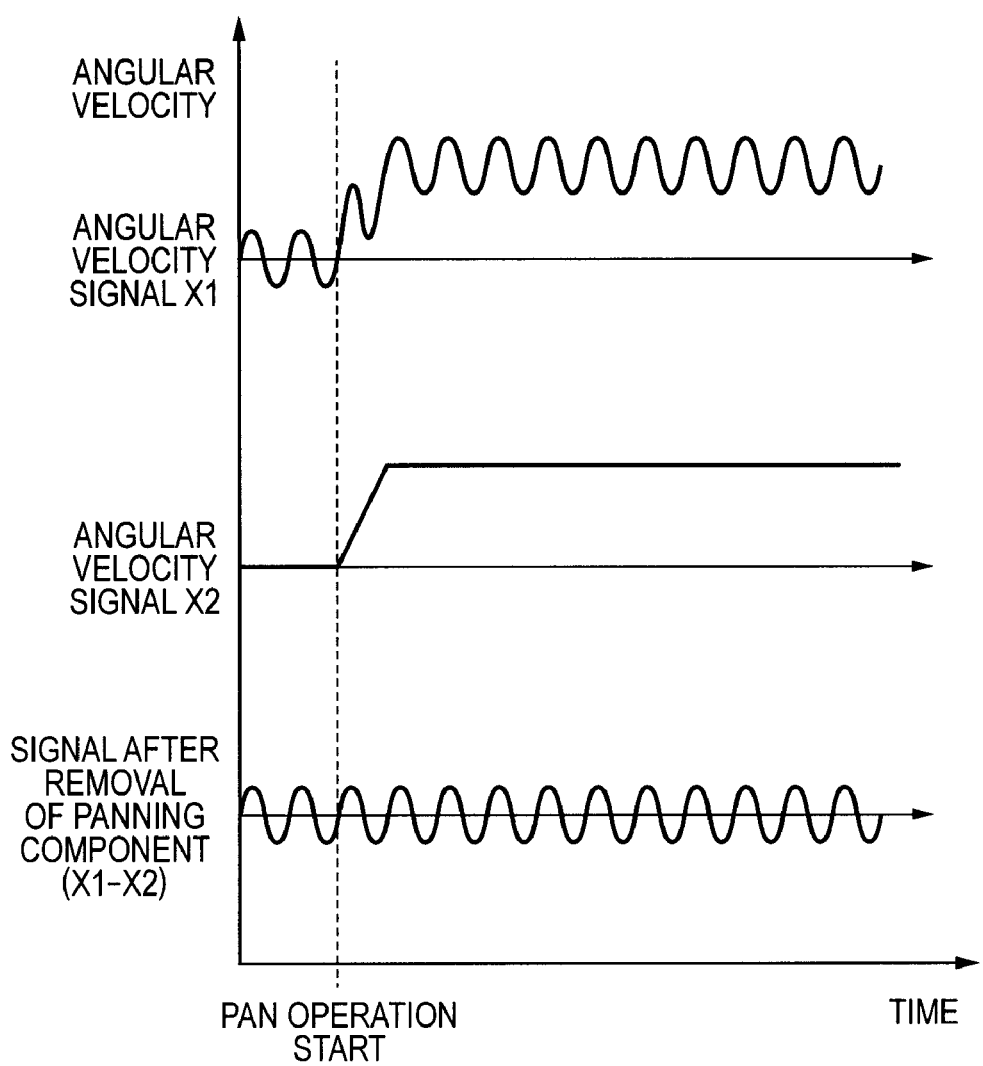
FIG. 3 is a graph of the elimination of the panning component according to the first embodiment.

A subtraction unit (subtraction portion) 15 subtracts the angular velocity signal which is output from the gain adjustment unit 14, from the angular velocity signal which is output from the HPF 11. FIG. 3 is a graph showing angular velocity signals before and after being processed by the subtraction unit 15 in a case where the pan operation is performed at an ideal fixed speed. An angular velocity signal X1 is generated based on the output from the vibration sensor 1, while an angular velocity signal X2 is generated based on the output from the pan/tilt operation angle outputting portion 9. The angular velocity signal X1 contains only a signal component attributed to vibration before the pan operation, but after the pan operation, contains a signal component attributed to the pan operation in addition to the signal component attributed to the vibration. The angular velocity signal X2 has an angular velocity of zero before the pan operation, but after the pan operation, contains only a signal component attributed to the pan operation. Therefore, the subtraction unit 15 subtracts the angular velocity signal X2 (panning signal component) from the angular velocity signal X1 (vibration signal component+panning signal component), to thereby eliminate the signal component attributed to the pan operation and generate an angular velocity signal containing only the signal component attributed to the vibration targeted for correction.

An integration unit 16 converts the angular velocity signal (velocity signal) output from the subtraction unit 15 into an angle signal (position signal). A correction unit 17 calculates a drive amount of the image blur correction lens 3 so that an image blur corresponding to the angle signal is corrected in consideration of a lens state such as a focal length thereof, and the drive amount thus obtained is output to the driving circuit 8 through the D/A converter (not shown). The signal output to the driving circuit 8 contains only the vibration component, and thus the image blur can be corrected with respect only to the vibration component regardless of whether the lens apparatus is in the stationary state or in the intended pan operation.

This embodiment has described a case where the angular velocity signal from the vibration sensor 1 is converted into a signal corresponding to an angle by using the HPF 11 and integration unit 16 configured by software, but the conversion calculation from an angular velocity into an angle may be implemented by hardware because the same effect can be obtained. Further, as the vibration sensor of this embodiment, an acceleration sensor such as an angular acceleration sensor or a linear acceleration sensor may be used instead of the angular velocity sensor. Such modification to the configuration may similarly apply to the subsequent embodiments of the present invention.

Second Embodiment

A second embodiment of the present invention is described below in detail with reference to FIG. 1 and FIG. 4.

A configuration of the second embodiment is the same as the configuration of the first embodiment illustrated in FIG. 1 and description thereof is therefore omitted herein.

Figure 4:
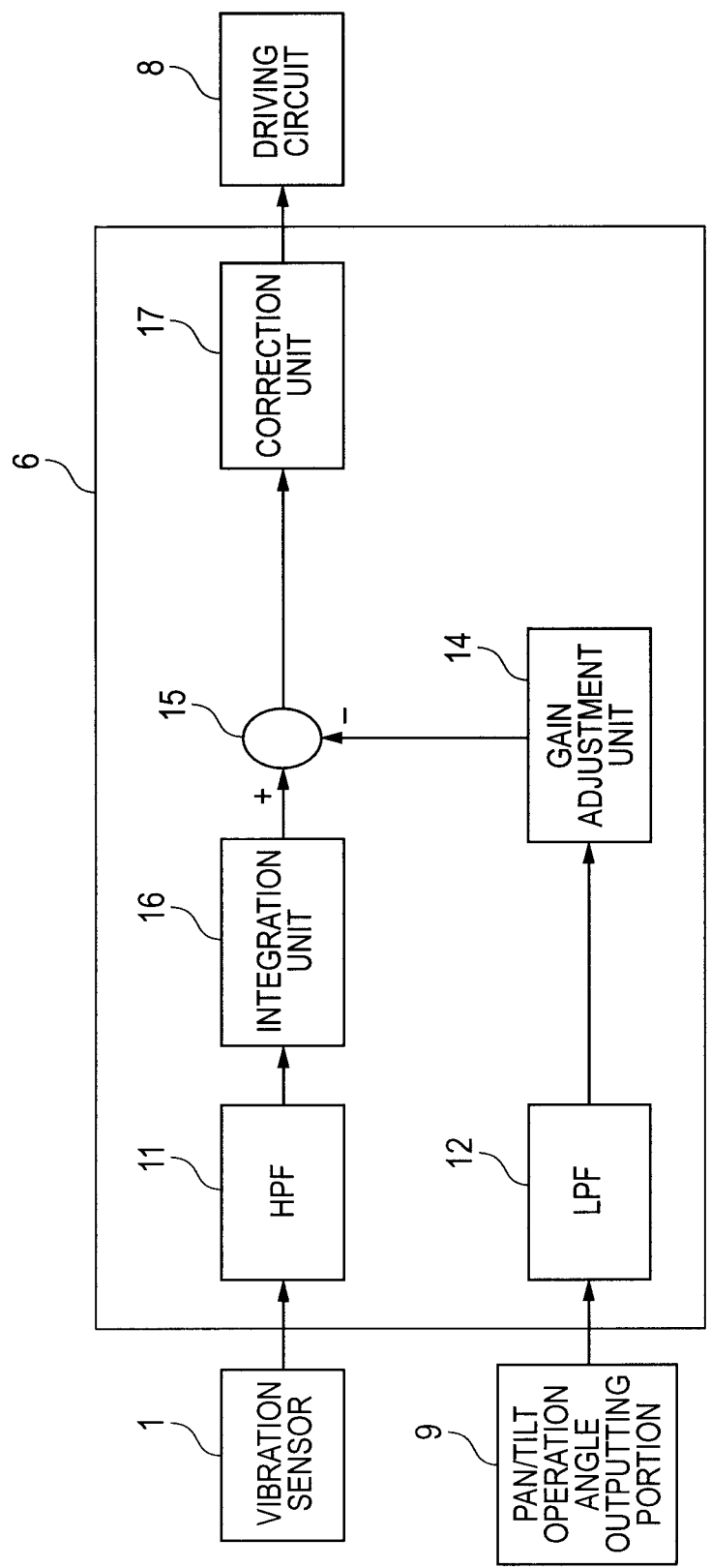
FIG. 4 is a block diagram of elimination of a panning component according to a second embodiment.

FIG. 4 is a block diagram illustrating an operation of elimination of a panning component, which is performed by the CPU 6 of the lens apparatus 20. Hereinbelow, the operation of the CPU 6 is described with reference to the block diagram of FIG. 4.

The CPU (driving signal calculation unit) 6 includes a detected vibration calculation portion for calculating a vibration signal based on the output from the vibration sensor 1, a panning/tilting component calculation portion for calculating a pan/tilt operation signal based on pan/tilt operation information input from the pan/tilt operation angle outputting portion 9, and a subtraction portion for subtracting the pan/tilt operation signal from the vibration signal.

In this embodiment, the detected vibration calculation portion includes the high-pass filter (HPF) 11 that passes only a high frequency component and the integration unit 16 which converts an angular velocity signal into an angle signal. The CPU 6 receives an angular velocity signal output from the vibration sensor 1 through the A/D converter (not shown). When the angular velocity signal is applied to the HPF 11, a DC component and a low frequency signal component are removed. The angular velocity signal after being applied to the HPF 11 is converted into the angle signal by the integration unit 16. The angle signal contains only a signal component attributed to vibration when the lens apparatus is not in the pan operation. When the lens apparatus is in the pan operation, on the other hand, the angular velocity signal contains a signal component attributed to the vibration and a signal component attributed to the pan operation.

In this embodiment, the panning/tilting component calculation portion includes the low-pass filter (LPF) 12 that passes only a low frequency component, and the gain adjustment unit 14. The CPU 6 receives an operation angle signal of the lens apparatus that is output from the pan/tilt operation angle outputting portion 9. When the operation angle signal is applied to the LPF 12, a high frequency vibration component is removed. The gain adjustment unit 14 adjusts the amplitude of the angle signal which has been applied to the LPF 12. The signal (pan/tilt operation signal) output from the gain adjustment unit 14 has an angular displacement of zero in the stationary state of the lens apparatus, but during the pan operation, has only an angle signal attributed to the pan operation.

Figure 5:
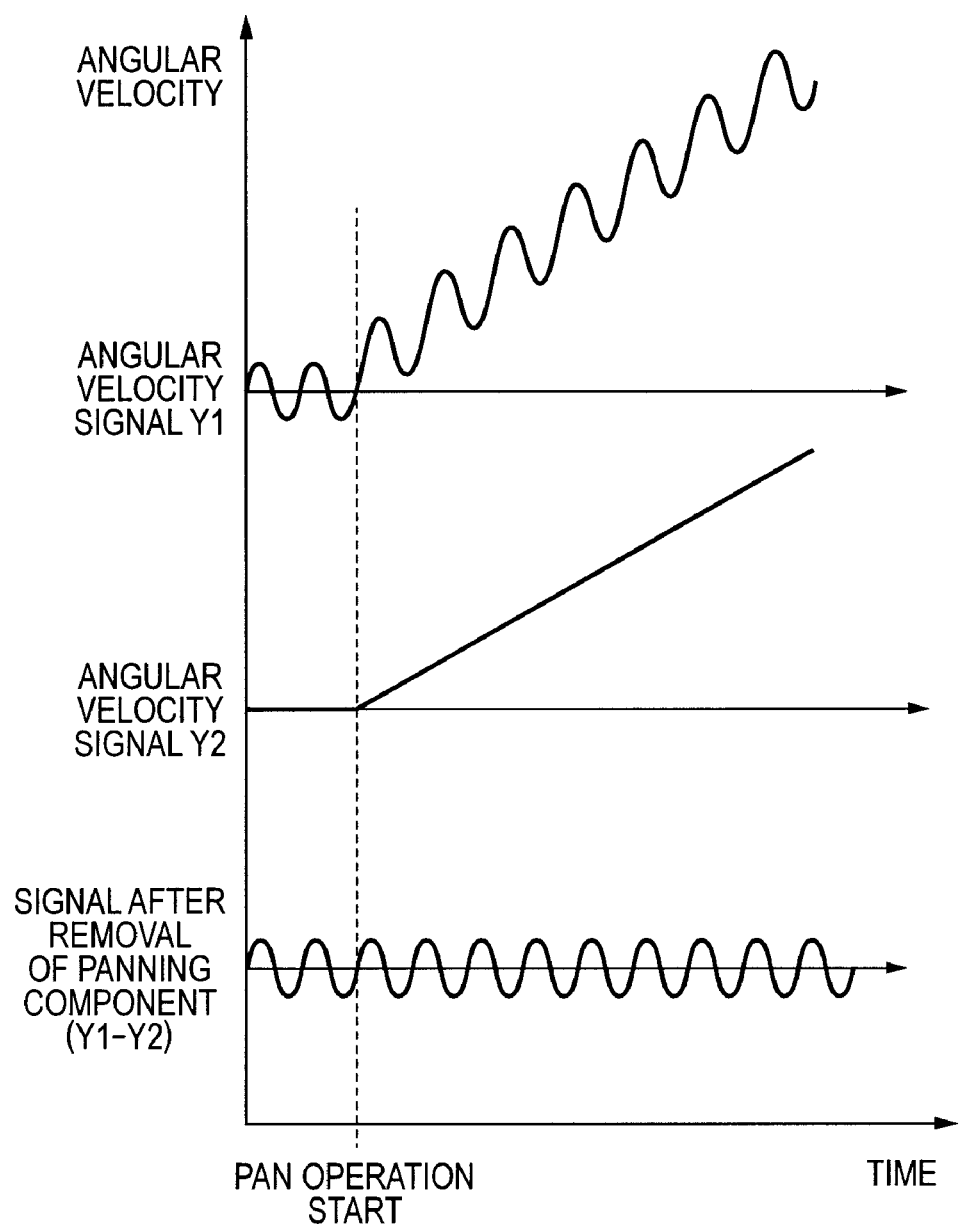
FIG. 5 is a graph of the elimination of the panning component according to the second embodiment.

A subtraction unit 15 subtracts the angle signal which is output from the gain adjustment unit 14, from the angle signal which is output from the integration unit 16. FIG. 5 is a graph showing angle signals before and after being processed by the subtraction unit 15 in a case where the pan operation is performed at an ideal fixed speed. An angle signal Y1 is generated based on the output from the vibration sensor 1, while an angle signal Y2 is generated based on the output from the pan/tilt operation angle outputting portion 9. The angle signal Y1 contains only a signal component attributed to vibration before the pan operation, but after the pan operation, contains a signal component attributed to the pan operation in addition to the vibration component. The angle signal Y2 has an angular displacement of zero before the pan operation, but after the pan operation, contains only a signal component attributed to the pan operation. Therefore, the subtraction unit 15 subtracts the angle signal Y2 (panning signal component) from the angle signal Y1 (vibration signal component+panning signal component), to thereby remove the signal component attributed to the pan operation and generate an angle signal containing only the signal component attributed to the vibration targeted for correction.

Based on the angle signal output from the subtraction unit 15, the correction unit 17 calculates a drive amount of the image blur correction lens 3 so that an image blur corresponding to the angle signal is corrected in consideration of a lens state such as a focal length thereof, and the drive amount thus obtained is output to the driving circuit 8 through the D/A converter (not shown). The signal output to the driving circuit 8 contains only the vibration component, and thus, similarly to the first embodiment, the image blur can be corrected with respect only to the vibration component regardless of whether the lens apparatus is in the stationary state or in the intended pan operation.

Third Embodiment

A third embodiment of the present invention is described below in detail with reference to FIG. 1 and FIG. 6.

In the third embodiment, correction for an image blur is stopped during a pan operation at a speed equal to or higher than a predetermined threshold value (equal to or higher than a panning speed threshold value).

A configuration of the third embodiment is the same as the configuration of the first embodiment illustrated in FIG. 1 and description thereof is therefore omitted herein.

Figure 6:
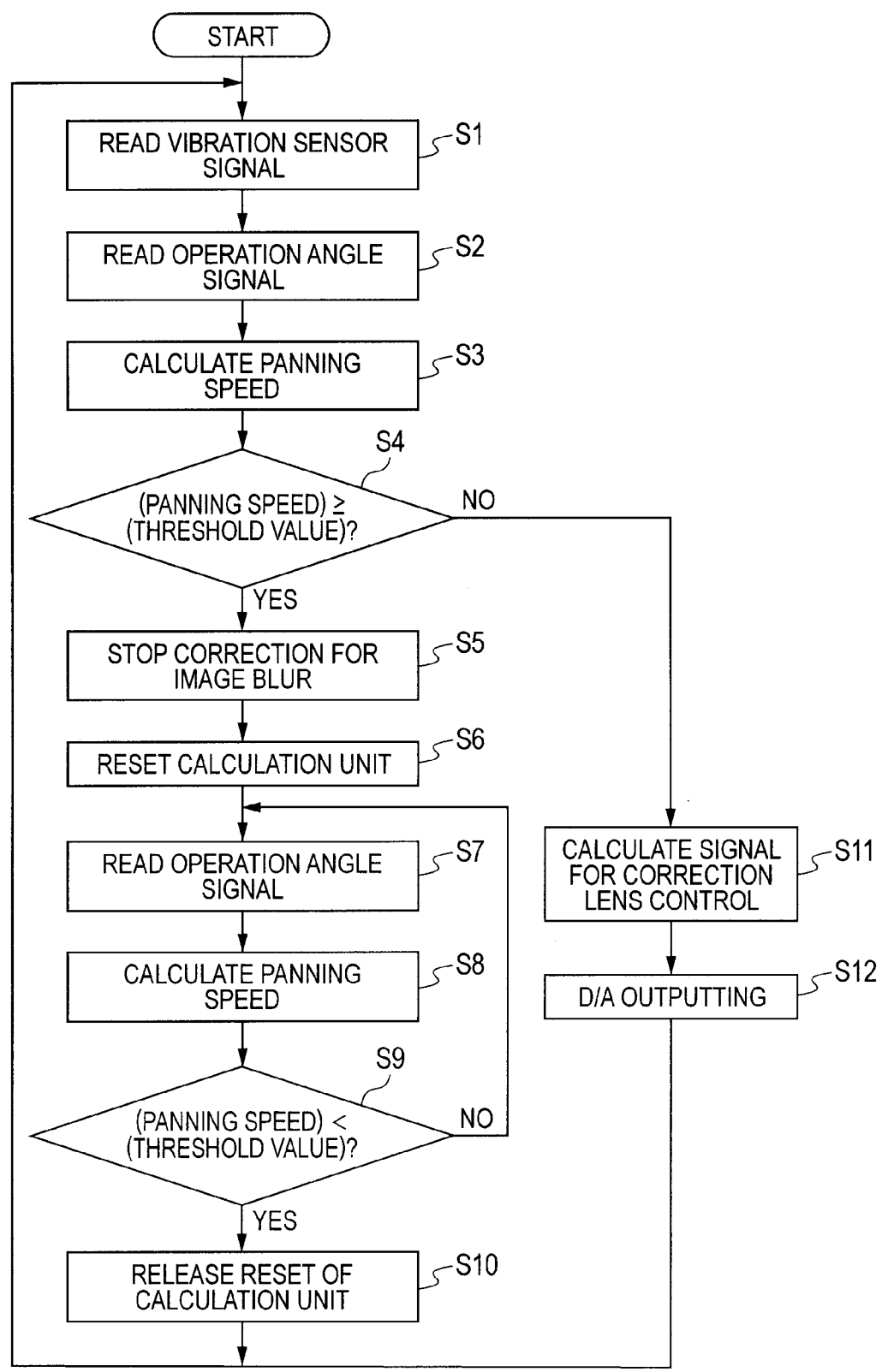
FIG. 6 is a flow chart of control on correction for an image blur according to a third embodiment.

FIG. 6 is a flow chart illustrating a series of operations of control on correction for an image blur, which is performed by the CPU 6. Hereinbelow, the operation of the CPU 6 is described with reference to the flow chart of FIG. 6.

In Step S1, the CPU 6 receives an angular velocity signal output from the vibration sensor 1 through the A/D converter. In Step S2, the CPU 6 receives an operation angle signal of the lens apparatus that is output from the pan/tilt operation angle outputting portion 9. In Step S3, a pan/tilt speed calculation portion (not shown) calculates a panning speed based on the signal received in Step S2. In Step S4, it is determined whether or not the panning speed is equal to or higher than the threshold value. The threshold value is set to a panning speed at which the displayed image transitions fast and therefore correction for an image blur is not necessary, and is determined based on an angle of field.

When the panning speed is lower than the threshold value, the processing proceeds to Step S11, in which the panning signal component is removed, to thereby generate a signal for correction lens control that contains only the signal component attributed to the vibration, similarly to the control described in the first and second embodiments. Then in Step S12, the signal for correction lens control is output to the driving circuit 8 through the D/A converter to correct the image blur. When the panning speed is equal to or higher than the threshold value in Step S4, the processing proceeds to Step S5. In Step S5, the correction for the image blur is stopped. In Step S6, the HPF 11 and the integration unit 16 are reset. In this reset operation, a cut-off frequency of the HPF 11 is set to a high frequency side and the value of integral of the integration unit 16 is cleared. For example, the cut-off frequency of the HPF 11 is set to 1 kHz to cut off all the signals in a frequency band of vibration targeted for general correction for an image blur (approximately 0.5 Hz to 30 Hz), to thereby initialize the HPF 11. Further, the value of integral of the integration unit 16 is cleared, and accordingly an angle obtained by integration of the angular velocity is cleared to zero. In Step S7, the CPU 6 receives an operation angle signal of the lens apparatus that is output from the pan/tilt operation angle outputting portion 9, similarly to Step S2. In Step S8, a panning speed is calculated based on the signal received in Step S7, similarly to Step S3. In Step S9, it is determined whether or not the panning speed obtained in Step S8 is equal to or higher than the threshold value. When the panning speed is equal to or higher than the threshold value, the processing is repeated from Step S7, and the HPF 11 and the integration unit 16 are kept reset until the panning speed becomes lower than the threshold value. When the panning speed is lower than the threshold value in Step S9, the processing proceeds to Step S10. In Step S10, the reset state of the HPF 11 and the integration unit 16 is released. Then, the processing returns to Step S1 and the correction for the image blur is resumed.

In this embodiment, the panning speed threshold value of the panning speed for stopping the correction for the image blur is uniquely determined based on the angle of field, but there may be provided a threshold value setting portion capable of changing the setting of the panning speed threshold value to an arbitrary value by using a switch or a communication unit with an image stabilizing apparatus. The switch may be provided to the lens apparatus or an operation member for controlling focusing and magnification. Further, the panning speed is calculated based on the output from the pan/tilt operation angle outputting portion 9, but may be calculated based on the output from the vibration sensor 1.

The description of the third embodiment is directed to the pan operation of the lens apparatus, but it should be noted that a predetermined tilting speed threshold value may be provided to stop the correction for the image blur in a case of a tilt operation at a speed equal to or higher than the tilting speed threshold value because the same effect can be obtained.

According to the present invention, in an image pickup apparatus including: a camera main body including an image pickup element; and a lens apparatus for guiding a beam from an object to the image pickup element, any one of the lens apparatus having the image stabilization function described in the above-mentioned first to third embodiments is adopted, to thereby provide an image pickup apparatus capable of correcting an image blur with respect only to the vibration component attributed to vibration from the ground or the like even during the pan/tilt operation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-297842, filed Dec. 28, 2009, which is hereby incorporated by reference herein in its entirety.

What is claimed is:

1. A lens apparatus, supported by a support member, comprising:
   a correction lens;
   a vibration detection portion that detects vibration of the lens apparatus;
   a controller that calculates a driving signal, wherein the controller is programmed to:
      calculate a vibration signal based on an output from the vibration detection portion;
      calculate a pan/tilt operation signal based on pan/tilt operation information input from the support member;
      subtract the pan/tilt operation signal from the vibration signal and outputs the result as the driving signal; and
      calculate a panning speed and a tilting speed based on the pan/tilt operation information input from the support member,
   a correction lens driving portion that drives the correction lens based on the driving signal from the controller,
   wherein when the panning speed calculated by the controller is equal to or higher than a panning speed threshold value or when the tilting speed calculated by the controller is equal to or higher than a tilting speed threshold value, the correction lens driving portion does not drive the correction lens.

2. A lens apparatus according to claim 1, wherein the vibration signal and the pan/tilt operation signal calculated by the controller comprise one of an angular velocity signal or a velocity signal.

3. A lens apparatus according to claim 1, wherein the vibration signal and the pan/tilt operation signal calculated by the controller comprises one of an angle signal or a position signal.

4. A lens apparatus according to claim 1, wherein the pan/tilt operation information comprises an operation angle of the support member.

5. A lens apparatus according to claim 1, wherein the controller is further programmed to set the panning speed threshold value and the tilting speed threshold value to arbitrary values.

6. An image pickup apparatus comprising:
   a camera main body having an image pickup element; and
   a lens apparatus that guides a beam from an object to the image pickup element,
   wherein the lens apparatus, which is supported by a support member, comprises:
      a correction lens;
      a vibration detection portion that detects vibration of the lens apparatus;
      a controller that calculates a driving signal, wherein the controller is programmed to:
         calculate a vibration signal based on an output from the vibration detection portion;
         calculate a pan/tilt operation signal based on pan/tilt operation information input from the support member;
         subtract the pan/tilt operation signal from the vibration signal and outputs the result as the driving signal; and
         calculate a panning speed and a tilting speed based on the pan/tilt operation information input from the support member,
      a correction lens driving portion that drives the correction lens based on the driving signal from the controller,
      wherein when the panning speed calculated by the controller is equal to or higher than a panning speed threshold value or when the tilting speed calculated by the controller is equal to or higher than a tilting speed threshold value, the correction lens driving portion does not drive the correction lens.

\* \* \* \* \*